H. A. CUMFER.
FRICTION CLUTCH.
APPLICATION FILED APR. 14, 1909.
942,056.
Patented Dec. 7, 1909.
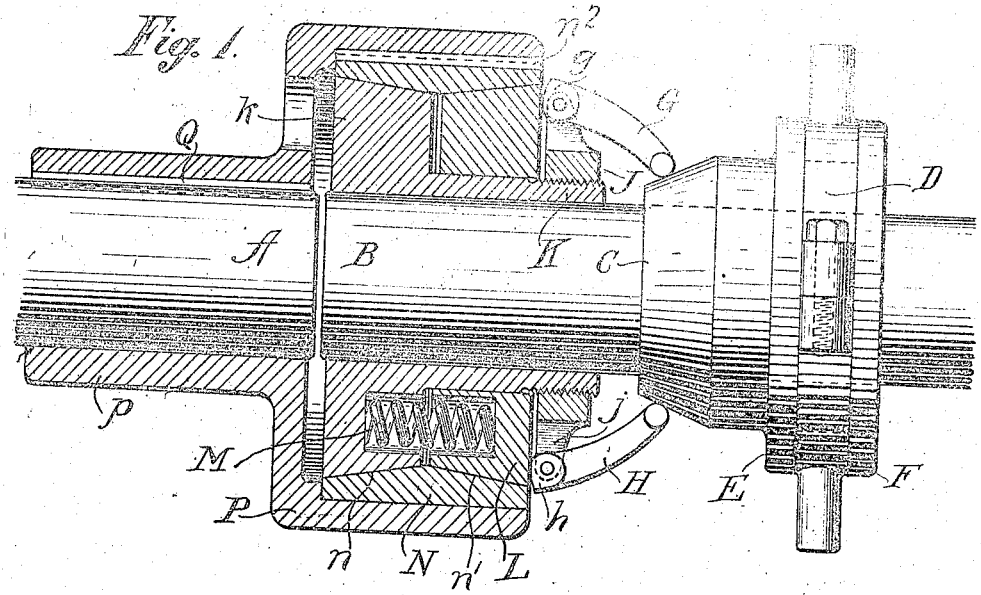
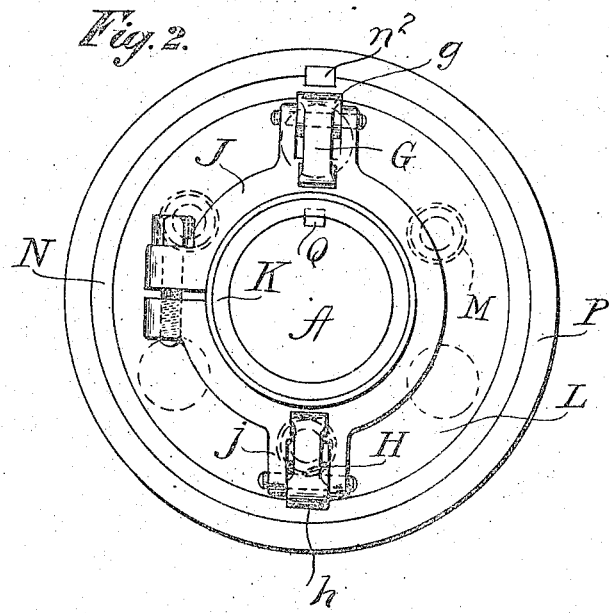
WITNESSES:
Geo. M. Mayer
R. C. Balinger
INVENTOR
Harry A. Cumfer
BY
Edwin Guthrie
ATTORNEY

UNITED STATES PATENT OFFICE.

HARRY A. CUMFER, OF CHICAGO, ILLINOIS, ASSIGNOR OF ONE-HALF TO FRANK ADAMS MITCHELL, OF CHICAGO, ILLINOIS.

FRICTION-CLUTCH.

942,056.  Specification of Letters Patent. Patented Dec. 7, 1909.

Application filed April 14, 1909. Serial No. 489,756.

*To all whom it may concern:*

Be it known that I, HARRY A. CUMFER, citizen of the United States, residing at Chicago, in the county of Cook and State of Illinois, have invented certain new and useful Improvements in Friction-Clutches, of which the following is a specification.

This invention relates to friction clutches, and belongs with that class of clutches wherein annular wedges are moved lengthwise of the shaft in opposite directions into contact with corresponding surfaces suitably arranged upon one member of the clutch to engage them.

The object of this invention is the production of a clutch having parts of special construction and particular arrangement, whereby it is believed a stronger, cheaper, and more effective clutch is made than any of those with which I am acquainted.

Like letters are employed to refer to the same parts throughout the description and drawings.

The construction and arrangement constituting this invention are set forth in the accompanying drawings, of which—

Figure 1 represents the invention in section lengthwise upon the abutting ends of two shafts. The shafts are shown in full. Fig. 2 is a view looking from the right, after the right hand shaft end has been removed.

Considering the drawings, the ends of the two alined shafts are marked A and B. A cone C is movable on shaft B and lengthwise thereof by means of the split collar D movably located between the parallel flanges E and F of the body of the cone C. Two arms G and H are pivotally supported on the split ring J by means of the ears $j$. The ring J is itself supported upon the sleeve K, which sleeve is movable on shaft B, and is formed usually integrally with the annular wedge $k$. Each of the arms G and H has an end in contact with the cone C, and the opposite ends of the arms, which are the pivoted ends, have cams $g$ and $h$ formed on them. The cams $g$ and $h$ bear against a second annular wedge L which is movable upon the exterior of the sleeve K and supported thereby. The two annular wedges are normally separated by springs M located in suitable sockets formed in the adjacent faces of the annular wedges. The wedges when moved engage corresponding surfaces of the clutch ring N. The surfaces thus engaged are referred to by the letters $n$ and $n'$. The clutch ring N is secured within an outer cup-shaped housing P by the key $n^2$, and the housing is secured to the shaft A by providing the hub $p$ of the casing P with a key Q.

In the operation of this invention, the cone C is moved along shaft B toward the clutch, which causes the cams $g$ and $h$ to force the annular wedge L in the same direction and to draw the annular wedge $k$ in the opposite direction, bringing the wedges into contact with the surfaces $n$ and $n'$ with great pressure, and thus transmitting power from one shaft to the other.

Having now described the construction of this invention, and the mode of its operation, what I claim is:—

1. In a friction clutch, the combination with a shaft, of a cone movable along the shaft, an annular wedge having a sleeve movably encircling the shaft, a ring secured upon the sleeve, arms pivotally supported by the said ring and having parts in contact with the said cone, an annular wedge movably supported on the exterior of the said sleeve, the said pivoted arms being provided with cams arranged to act upon the said last-mentioned annular wedge, springs interposed between the wedges to hold them normally apart, and a separate clutch member having surfaces arranged adjacent to the inclined surfaces of the annular wedges.

2. In a friction clutch, the combination with a shaft, of a cone movable along the shaft, an annular wedge having a sleeve movably encircling the shaft, a ring secured upon the sleeve, arms pivotally supported by the said ring and having parts in contact with the said cone, an annular wedge movably supported on the exterior of the said sleeve, the said pivoted arms being provided with cams arranged to act upon the said last-mentioned annular wedge, springs interposed between the wedges to hold them normally apart, and a separate clutch member comprising a cylindrical housing having a ring secured within it, the said ring having surfaces arranged adjacent to the inclined surfaces of the annular wedges.

In testimony whereof I affix my signature in presence of two witnesses.

HARRY A. CUMFER.

Witnesses:
GEO. E. MAYER,
CHARLES I. COBB.